Patented May 26, 1925.

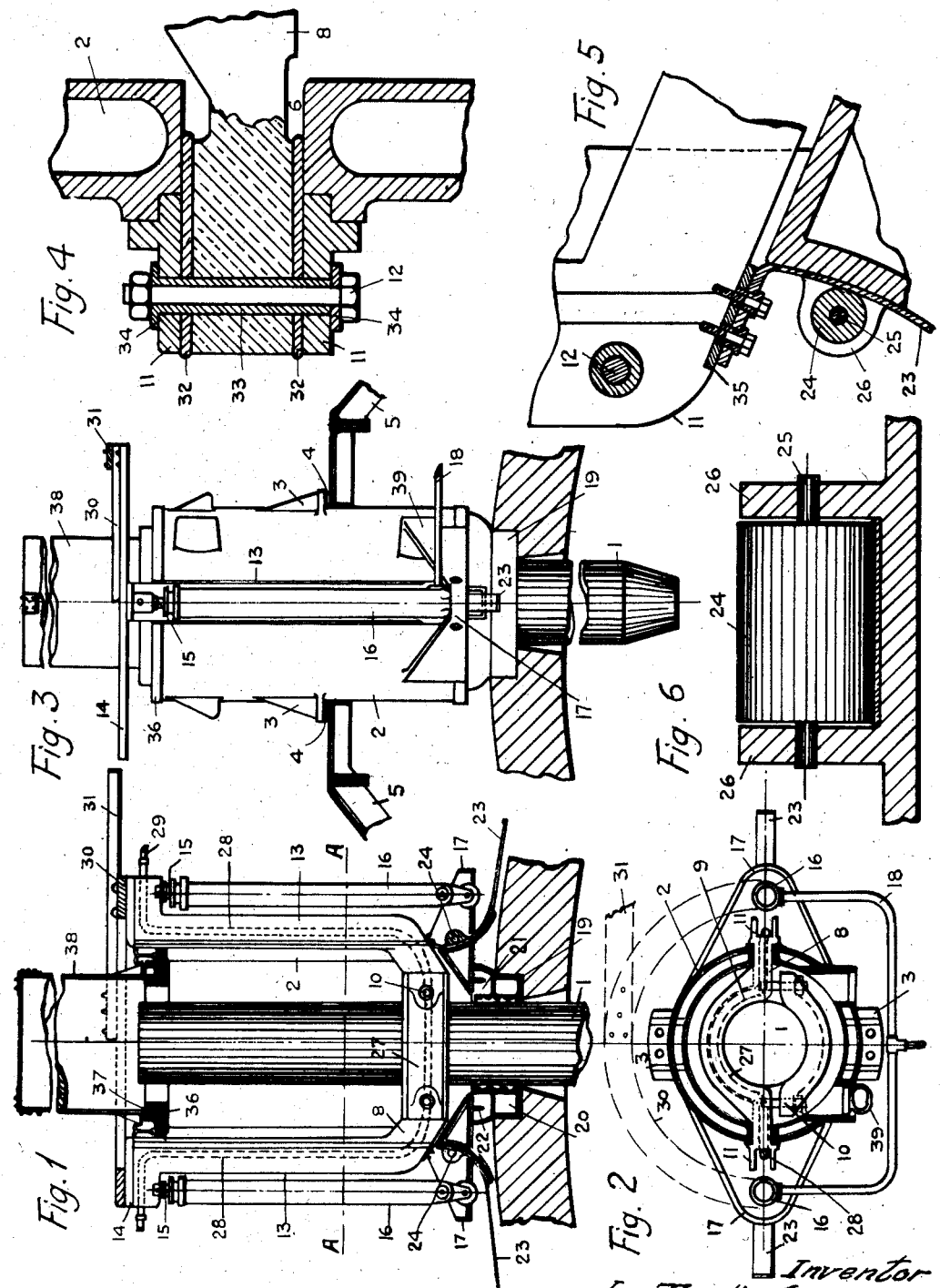

1,539,703

UNITED STATES PATENT OFFICE.

LEONE TAGLIAFERRI, OF GENOA, ITALY.

ELECTRIC FURNACE.

Application filed October 17, 1922. Serial No. 595,205.

*To all whom it may concern:*

Be it known that I, LEONE TAGLIAFERRI, a subject of the King of Italy, and resident of Genoa, Italy, have invented certain new and useful Improvements in Electric Furnaces, of which the following is a specification.

The present invention refers to improvements in electric furnaces the object being to simplify the operating means of the electrodes and besides to render the openings gas tight across which the electrodes penetrate the walls of the furnace, obtaining in this manner a high economy in the consumption of the electrodes as well as in the consumption of the electric current.

The invention is illustrated in a form of execution in the drawings:

Fig. 1 shows in a vertical sectional middle view the operating device of the electrodes with the closing means of the opening in the top of the furnace;

Fig. 2 is a section along the line A—A of Fig. 1;

Fig. 3 is a view of the device of Fig. 1 rotated around an angle of 90 degrees with respect to Fig. 1;

Fig. 4 is an enlarged fragmentary horizontal section view showing the mounting of the electrode support, Fig. 5 is a fragmentary elevational detail of the arrangement shown in Fig. 4, and Fig. 6 is an enlarged fragmentary sectional detail of one of the guide rollers for the flexible blades.

In these figures the electrode 1 is surrounded by a concentrically arranged cylinder 2 supplied with a water jacketed wall for water circulation. The cylinder 2 connects by means of flanges 3 with the intermission of liners 4 of insulating material with the brackets 5 fastened upon the top of the furnace. The cylinder 2 is provided with two longitudinal diametrically arranged opposite slots 6 across which projects the electrode holder 8 constituted in the interior of the cylinder by a clamp 9 made in two sections connected together and fixed on the electrode by means of the bolts 10. The electrode holder is guided there where it passes the slots of the cylinder and upon the walls of the cylinder by ledges 11 fastened upon the electrode holder by bolts 12, these ledges extending in two rods 13 of U shape parallel with the axis of the cylinder for a length substantially corresponding with the travel of the electrodes. The rods 13 are connected together at the upper outturned ends thereof by a metallic annular piece 14. At the ends of the rods 13 are besides fastened by a hinged connection the piston rods 15 of the two hydraulic cylinders 16 the lower ends of which are fastened upon the supports 17 integral with the base of the cylinder. In order to let the pressure in the hydraulic cylinders a pipe 18 which leads from a hydraulic pressure plant (not shown) is arranged in connection with the cylinders. The admission and the discharge of the fluid under pressure (water or oil) in and from the cylinders effects the lifting and the downward movement of the electrode holder and the electrode connected to it. This distribution is established by means of a special regulator which does not form an object of the present invention and which can be operated by hand as well as automatically in applying the current utilized for the feeding of the electrodes. The operation of the electrodes is therefore simply effected by means of two hydraulic cylinders fastened with the electrode holder without requiring other complicated means.

In order to establish a perfect tightness and to realize economy in the consumption of the electrodes as well as in the consumption of energy the electrode is surrounded by an annular body 19 fastened in the wall of the furnace comprising in its lower part a chamber 20 within which circulates cooling water and in its upper part a chamber 21 open towards the top and filled with sand and within which latter chamber is projecting the circular edge 22 of the base of the cylinder. In order to obtain also a good closure of the longitudinal slots of the cylinder 2 and to hinder the discharge of gas which could take its way from the interior of the furnace along the electrode into the interior of the cylinder 2, upon the electrode holder are fastened the two flexible metal blades 23 which extend along the walls of the base of the cylinder and are pushed against said walls in correspondence with the slots 6 by means of rollers 24 arranged upon the pins 25 supported by the bearings 26 integral with the base of the cylinder. The blades 23 during the lifting of the electrode holder close the openings of the slots 6 between the electrode holder and the base of the cylinder whilst in the downward movement of the electrode holder these blades project laterally and slide upon the wall of the base of the cylinder, against which they are kept in adherence by means of the rollers 24. 27 is a port obtained by fusion in the electrode holder to which the refrigerating water is admitted by the pipe 28 and flexible pipe 29. 30 is a semicircular annular piece of copper to which connects the conductor in copper 31 and by means of which elements the current is conducted to the electrode. In order to establish the perfect insulation of the electrode holder from the cylinder between the rods 13 and electrode holder 8 are interposed the micanite liners 32 while the bolts 12 are also supplied for insulating purposes with micanite bushings 33 and washers 34 of micanite. For the same purpose the flexible blades 23 do not connect directly with the electrode holder but only by the intermission of the micanite linings 35. 36 is an annular piece fastened with the cylinder 2 supplied with a circular chamber 37 filled with sand within which projects the cylindrical casing 38 which closes the upper part of the device. 39 are plugs threaded in openings of the cylinder 2 allowing to reach with a key the nuts of the bolts 10 from the outside of the cylinder.

Having now particularly described and ascertained the nature of my said invention and in what manner the same is to be performed, I declare that what I claim is:—

1. In an arrangement of the character described, a support, a cylinder mounted on the support, supporting brackets at the lower end of the cylinder, an electrode arranged in the cylinder, a support movable vertically in the cylinder for accommodating the electrode, hydraulic cylinders and pistons respectively connected to the electrode support and the supporting brackets, and means for controlling the pressure in the hydraulic cylinders for regulating the adjustment of the electrode.

2. An arrangement of the character described including a main support, a cylinder thereon provided with opposed vertical slots, an electrode positioned in the cylinder, a support for the electrode of U-shaped formation composed of a clamp at the medial portion and spaced parallel side portions slidable in the slots, means for raising and lowering the U-shaped support, and flexible blades fastened to the medial portion of the electrode support and covering the slots in the cylinder during and subsequent to the adjustment of the electrode.

3. An electrode support for electric furnaces including in combination a furnace body provided with an electrode receiving opening, a support above the furnace body, a cylinder mounted on the support and provided with opposed vertical slots, supporting brackets at the lower end of the cylinder, an electrode arranged in the cylinder and projecting through the opening of the furnace body, a support for the electrode of U-shaped configuration including a clamp at the medial portion and spaced side portions slidable vertically in and projecting through the slots in the cylinder, coacting hydraulic cylinders and pistons arranged respectively between the upper ends of the side portions of the supports and the supporting brackets, means for controlling the pressure in the hydraulic cylinders for regulating the adjustment of the electrode, flexible blades fastened to the medial portion of the electrode support and movable therewith for covering the slots in the cylinders, the supporting brackets being provided with openings, curved portions adjacent said openings forming guiding supports for the blades, and rollers mounted on the supporting brackets for coacting with the blades to properly position the blades during adjustment of the electrode support.

4. An arrangement as claimed in claim 3, wherein an annular member is mounted in the furnace body about the opening and beneath the cylinder and includes a lower cooling chamber and an upper opened ended sand receiving chamber for accommodating the lower edge of the cylinder.

5. An arrangement as claimed in claim 3, wherein an annular member is mounted at the top of the cylinder and is formed on its upper surface with a sand receiving chamber, and a closing cap for the cylinder support in the sand receiving chamber.

6. An arrangement as claimed in claim 2, wherein the U-shaped support is formed throughout with a port for receiving a refrigerating cooling water, and flexible pipes connected with the respective ends of the port.

7. An arrangement as claimed in claim 2, wherein an annular current conducting member is connected to the upper ends of the side portions of the electrode support.

8. An arrangement as claimed in claim 2, wherein insulating washers are arranged on opposite sides of the medial portion of the electrode support and between said portion and the side portion of the said support.

In testimony whereof I have signed my name to this specification.

LEONE TAGLIAFERRI.

Witnesses:
 Adolfo Weber,
 Adolfo Benedetti.